United States Patent
Ben-Arie

(10) Patent No.: US 9,902,557 B2
(45) Date of Patent: Feb. 27, 2018

(54) CLASPING DEVICE FOR INFUSION BAGS III

(71) Applicant: Jezekiel Ben-Arie, Chicago, IL (US)

(72) Inventor: Jezekiel Ben-Arie, Chicago, IL (US)

( * ) Notice: Subject to any disclaimer, the term of this patent is extended or adjusted under 35 U.S.C. 154(b) by 24 days.

(21) Appl. No.: 14/715,617

(22) Filed: May 19, 2015

(65) Prior Publication Data
US 2015/0336737 A1 Nov. 26, 2015

Related U.S. Application Data

(60) Provisional application No. 62/002,863, filed on May 25, 2014.

(51) Int. Cl.
| | |
|---|---|
| *B65D 85/812* | (2006.01) |
| *F16B 2/00* | (2006.01) |
| *F16B 2/22* | (2006.01) |
| *B65D 85/804* | (2006.01) |
| *B65D 25/22* | (2006.01) |
| *B42F 1/02* | (2006.01) |
| *B65D 77/24* | (2006.01) |
| *A47G 19/16* | (2006.01) |
| *A47G 19/14* | (2006.01) |

(52) U.S. Cl.
CPC ......... *B65D 85/812* (2013.01); *B65D 85/804* (2013.01); *F16B 2/005* (2013.01); *F16B 2/22* (2013.01); *A47G 19/14* (2013.01); *A47G 19/16* (2013.01); *B65D 77/24* (2013.01)

(58) Field of Classification Search
CPC .... B65D 85/812; B65D 85/804; B65D 77/22; B65D 77/24; F16B 2/02; F16B 2/20; F16B 2/22; A47G 19/14; A47G 19/16
USPC ...... 248/312.1, 313, 316.7, 95, 693; 426/78, 426/82, 86; 40/299.01, 324, 427, 667; 206/0.5; 24/3.13, 67 P; 99/323; 112/156
See application file for complete search history.

(56) References Cited

U.S. PATENT DOCUMENTS

| | | | | |
|---|---|---|---|---|
| 2,835,057 | A * | 5/1958 | Mathews | B65D 85/812 40/324 |
| 3,215,533 | A * | 11/1965 | Gustav | B65D 85/812 206/0.5 |
| 3,517,604 | A * | 6/1970 | Coors | A47G 19/14 99/323 |
| 3,861,284 | A | 1/1975 | Costello | |

(Continued)

FOREIGN PATENT DOCUMENTS

KR  10-2011-0037156  * 4/2011

*Primary Examiner* — Tan Le

(57) ABSTRACT

A clasping device for anchoring beverage infusion bags inside a cup. The clasping device is tied with a string to the infusion bag and is mounted on top of the cup's rim. Two grippers with serrated surfaces grip at opposite locations on both sides of the cup's wall by pressing the wall with sharp protrusions which intensify the friction force between the grippers and the cup. The grippers' pressing forces originate from elastic forces which are created from forcing the gap between the grippers to widen when the clasping device is mounted on top of the cup's rim. The clasping device is manufactured from flat, resilient plate and has flat structure which enables to pack it along with the infusion bag in a flat package. An optional hollow figurine, which contains liquid additive can be attached as well. The string tying method into slits is efficient and inexpensive.

4 Claims, 3 Drawing Sheets

(56) References Cited

U.S. PATENT DOCUMENTS

| | | | |
|---|---|---|---|
| 4,011,639 A * | 3/1977 | Koleske | A45D 8/24 |
| | | | 132/276 |
| 4,153,153 A | 5/1979 | Herzog | |
| 4,220,079 A | 9/1980 | Sims | |
| 4,224,168 A | 9/1980 | Tragardh | |
| 4,250,990 A | 2/1981 | Casper | |
| 4,510,654 A * | 4/1985 | Muller | A47G 19/16 |
| | | | 24/3.13 |
| 4,619,830 A | 10/1986 | Napier | |
| 4,875,574 A | 10/1989 | Travers | |
| 4,880,110 A * | 11/1989 | Walker | B65D 85/812 |
| | | | 206/0.5 |
| 5,620,724 A | 4/1997 | Adler | |
| 5,657,712 A * | 8/1997 | Romagnoli | B65B 29/04 |
| | | | 112/156 |
| 6,746,699 B2 | 6/2004 | Lohrey | |
| 7,763,295 B2 | 7/2010 | Mayr | |
| 7,806,044 B2 | 10/2010 | Lin | |
| 7,937,813 B2 * | 5/2011 | Peck | B42F 1/02 |
| | | | 24/67 P |
| 2006/0045935 A1 | 3/2006 | Mcloughlin | |
| 2014/0134311 A1 | 5/2014 | Hong | |

\* cited by examiner

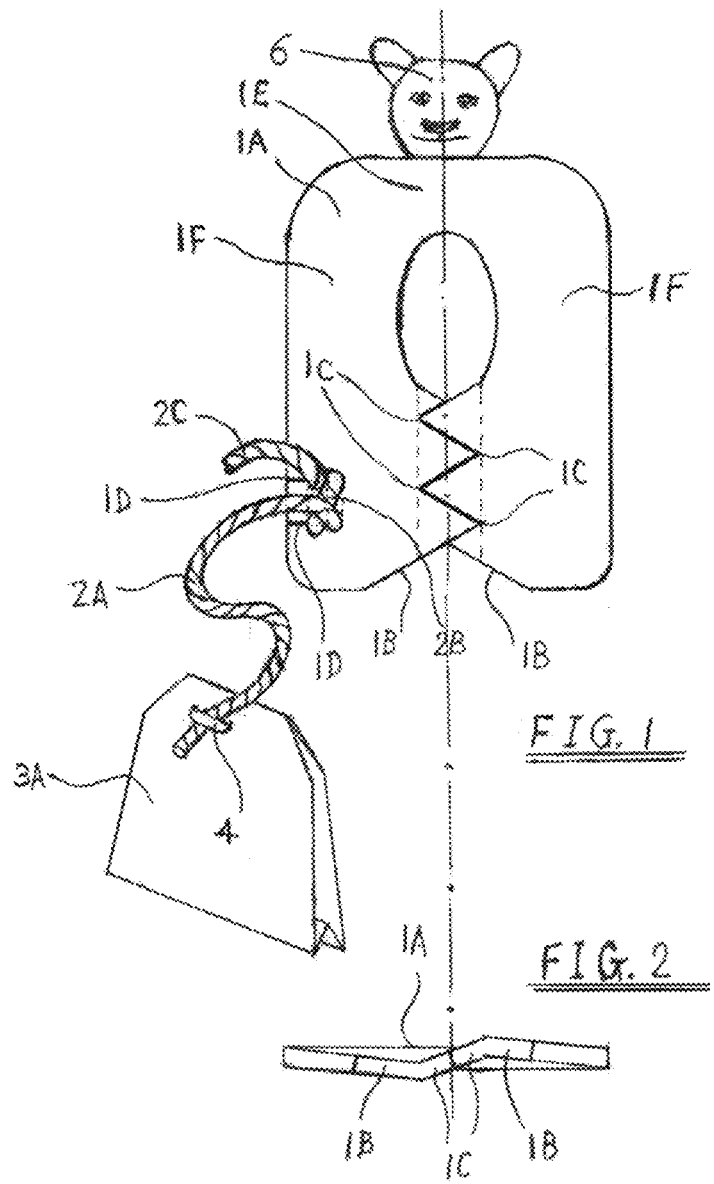

CLASPING DEVICE FOR INFUSION BAGS III

CROSS-REFERENCE TO RELATED APPLICATIONS

This application claims the benefit of a provisional patent application:
Ser. No. 62/002,863 filed on May 25, 2014

FEDERALLY SPONSORED RESEARCH

Not Applicable

SEQUENCE LISTING OR PROGRAM

Not Applicable

BACKGROUND OF THE INVENTION

1. Field of the Invention

The invention is in the area of Clasping Devices for infusion bags. Clasping devices enable to anchor the string tied to infusion bag to the rim of the cup, thus keeping the bag inside the cup while water is poured into the cup. Such clasping devices also can present beverage information and can hold hollow figurines which contain liquid beverage additives.

2. Description of Related Art

Currently, prevalent infusion bags for tea and other beverages are attached to a string which ends with a small paper tag which is attached to the end of the string. The user drops the bag into the cup and anchors it to the cup by placing the paper tag over the cup's rim such that it dangles outside the cup. Next, the user pours hot water into the cup and lets the bag to be immersed in the water. The problem is that frequently the water poured pulls the string along with the paper tag into the cup and the user has to dig it out from the hot water where it becomes wet and messy. Adding sugar and mixing it with a spoon also may pull the tag into the cup. In addition, many people like to keep the bag in the cup while drinking the beverage. Here again, tilting the cup for drinking may cause the paper tag to be pulled into the cup or could drop the infusion bag out of the cup. Hence, the objective of this patent is to anchor firmly the infusion bag to the cup's rim by a novel clasping device.

The search for clasping devices for infusion bags yielded only patents which described other arrangements for retention of infusion bags in cups or in other vessels. None of these arrangements for infusion bag retention included clasping devices.

In U.S. Pat. No. 4,220,079 (Sep. 2, 1980) Sims invented a retention of infusion bags by hanging a tag outside the cup which is attached to the infusion bag residing inside the cup by a string. This retention method is being used until today for most if not all of the infusion bags. The problem with this method is that the retention force is proportional to the weight of the tag. Since tags are usually made of cardboard paper they are too light to hold the bag firmly in place and they tend to be drawn into the cup when the user pours water on the bag.

In U.S. Pat. No. 7,763,295 B2 to Mayr et al. (Jul. 27, 2010) describes an infusion bag made of woven material, which is connected to a paper tag by a string for bag retention. No clasping device is proposed. In U.S. Pat. No. 6,746,699 B2 (Jun. 8, 2004) Lohrey et. al. proposed a novel method of folding infusion bags and tying the folds to a string. No clasping device is proposed. In U.S. Pat. No. 5,657,712 (Aug. 19, 1997) Romagnoli proposed a novel method for infusion bag retention by tying a tag to a string of infusion bag. No clasping device is proposed.

In U.S. Pat. No. 4,875,574 (Oct. 24, 1989) Travers invented a paper packaging which is attached to the infusion bag by a flexible strip. Opening the packaging produces a central panel to which the bag is hingedly attached and two side panels which extend laterally from both sides of the central panel and engage the outer surface of the cup in which the infusion process takes place. This arrangement attaches the bag to the rim of the cup quite weakly since the flexible strip holding the bag applies only a weak lateral holding force which is proportional to the weight of the bag. Such an arrangement could have only a very small fraction of holding force compared to a clasping device. Since the lateral holding force of Travers's depends on the force of gravity applied on the bag, tilting the cup for drinking could dislodge the bag from its place and could even drop it out of the cup.

In U.S. Pat. No. 4,250,990 (Feb. 17, 1981) Casper invented an infusion bag hinging arrangement based on a cross bar with the shape of inverted V. The cross bar is placed on the rim of the cup while the bag is hinged in its midpoint. Such an arrangement is suitable only for prior immersion of the bag in the cup. But the bag must be removed from the cup before drinking because the V bar blocks the cups top. In U.S. Pat. No. 4,153,153 (May 8, 1979) Herzog proposed a retention method by attaching a pre-gummed bag to the inner side of the cup's wall. This retention method prevents the need to fish out the bag's tag from the brewed water if it was drawn into the cup due to water pouring. The disadvantage of this method is that the gum might be mixed with the brewed drink and could be smeared in the cup as well.

In U.S. Pat. No. 4,619,830 (Oct. 28, 1986) Napier invented a retention method by suspending the infusion bag or pouch from a rod put across the cup's rim. This retention method does not allow drinking the beverage while the bag is immersed in the water and also it is quite an expensive method since it requires using a new rod for every bag.

In Application US 2006/0045935 A1 (Mar. 2, 2006) McLoughlin invented a bag retention method by securing the string to the outer surface of the cup using a securing element made of Velcro. The problem is that the cup must also have a piece of Velcro attached to its outer surface. Such a securing element might be detached when the cup is rinsed after use.

In Application US 2014/0134311 A1 (May 15, 2014) Hong invented a string holder using a lid with narrow string passage. This approach is impractical because it requires using a special lid for every cup in addition to the infusion bag. In U.S. Pat. No. 7,806,044 (Oct. 5, 2010) Lin invented a cup lid which is used for infusion bag retention. This approach is impractical because it requires a special lid for every cup.

In U.S. Pat. No. 3,861,284 (Jan. 21, 1975) Costello invented an infusion bag retention system using a cup lid with a shape of a funnel through which the bag is inserted into the cup. This approach is impractical because it requires a special lid for every cup.

In U.S. Pat. No. 4,224,168 (Sep. 23, 1980) Tragardh invented a holder for filter bags using a special handle which is inserted into the cup with the bag during immersion. This is impractical since it requires a special handling tool available to every user.

In U.S. Pat. No. 4,510,654 (Apr. 16, 1985) Muller invented a holder for filter bags which submerges the bag in the cup by a metal frame which holds the bag and which is chained to the cup's rim by a metal chain.

In U.S. Pat. No. 5,620,724 (Apr. 15, 1997) Adler invented an infusion bag holder comprising a disposable paper cup which is used for bag packaging, brewing and drinking.

All these patents are entirely different from our clasping device.

3. BRIEF DESCRIPTION OF THE INVENTION

Prevalent infusion bags for tea and other beverages are attached to a string which ends with a small paper tag which is tied to the end of the string. The user drops the bag into the cup and anchors it to the cup's wall by placing the paper tag over the cup's rim such that it dangles outside the cup. Next, the user pours hot water into the cup and lets the bag to be immersed in the water. The problem with this anchoring arrangement is that frequently the water poured pulls the string and the paper tag into the cup and the user has to dig it out from the hot water where it becomes wet and messy. Adding sugar and mixing it with a spoon also may pull the tag into the cup. In addition, many people like to keep the bag in the cup while drinking the tea. Here again, tilting the cup for drinking may cause the paper tag to be pulled into the cup or cause the bag to fall of the cup.

The purpose of this invention is to solve the problem of infusion bag retention by anchoring bags to cups by a clasping device. This invention proposes replacing the paper tag with a resilient clasping device, which is placed on top of the rim of the cup and grips the cup by pressing two serrated grippers on opposite locations on the cup's wall. The grippers have fitting sharp protrusions in order to intensify the holding power of the grippers on the cup's walls. The proposed clasping device is tied to one end of the string by inserting the string into two narrow slits which were cut at the side of the clasping device and wrapping it around the side section between the two slits. This is a simple but efficient method which does not require any additional means such as staples. The second end of the string is stapled to the infusion bag.

The proposed clasping device could be made of a large variety of resilient materials such as plastic or metal. In one optional embodiment, the Clasping Device is made by cutting a flat and resilient plate which is structured as two arms connected by a bridge at the top. The arms end at the bottom with a pair of opposite ramps. The spacing between the opposite ramps is wider at the bottom and gradually narrows. Two opposing sections of serrated surfaces with sharp protrusions reside at the top side of the ramps. These surfaces act as a pair of grippers which are designed to hold the clasping device in place on the cup. When one wants to use the clasping device, the user places the bottom of the ramps on top of the cup's rim and pushes the Clasping Device downwards. Since the spacing between the ramps gradually narrows, it becomes at some point smaller than the cup's rim thickness. Pushing the Clasping Device further downwards gradually forces the gap between the ramps to widen and its arms to twist outwards and open while allowing the clasping device to be pushed fully downwards. The twisted arms exert an elastic force inwards, which causes the arms to press the serrated surfaces against the inner and outer opposite points of the cup's walls. At this position, one of the serrated surfaces is pressing the cup's wall inner surface while the other serrated surface is pressing the outer surface of the cup's wall in an opposite location. Since the serrated surfaces have sharp protrusions which concentrate their pressure they intensify the friction force between the protrusions and the surfaces of the cup. The intensified friction force enables the clasping device to grip the cup firmly and hold the clasping device in place on top of the rim. As a result, the infusion bag, which is tied to the Clasping Device, is anchored firmly to the cup's rim.

The clasping device is quite flat since it is manufactured by cutting and slightly bending a resilient plate. The flat shape of the clasping device enables to pack it together with its string connected infusion bag in a flat, airtight package which preserves the freshness of the beverage in the bag.

An additional feature of the invention is the efficient and economical method for tying the string to the clasping device. The string is inserted into two narrow slits and wrapped around the side section between the slits. The slits are created by cutting two parallel cuts at the side of one gripper. The narrow slits hold the string quite firmly without needing for any additional means such as staples.

Another advantage of the clasping device is that it fits cups with a wide range of wall thicknesses. Also, when the clasping device is installed on a cup it occupies very little space since it positions itself with its flat shape in parallel with the cup's wall.

In addition, the flat surface of the clasping device allows the manufacturers to print on the surface their emblem and additional information on the beverage in the bag. The top side of the clasping device also could be sculpted and painted as different figurines. Unlike paper tags, which dangle down from the cup and are not visible, the clasping device remains in a visible, upright position on top of the cup and can be used to advertize the manufacturer and the beverage. The clasping device can also hold a hollow and flexible figurine which could be filled with a liquid beverage additive such as lemon juice, which could be added to the beverage by squeezing the figurine.

4. BRIEF DESCRIPTION OF THE DRAWINGS

FIG. 1 illustrates a frontal view of an embodiment of the Clasping Device along with a three dimensional drawing of the string attached infusion bag.

FIG. 2 describes a bottom view of the Clasping Device shown in FIG. 1.

5. DETAILED DESCRIPTION OF THE DRAWINGS

Figure 5:
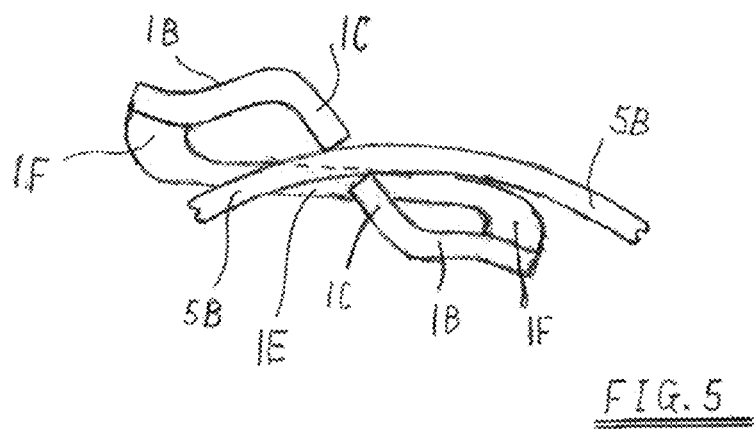
FIG. 5 is a bottom view of the grippers of the clasping device and shows their position when they are mounted on a cup's wall. The bottom view was chosen since it shows the special bending and the twisting of clasping device's grippers and arms.

FIG. 1 illustrates a frontal view of the Clasping Device 1A along with a three dimensional drawing of the string 2A attached infusion bag 3A. The bottom side of the clasping device 1A has two opposite ramps 1B which enable to insert the clasping device on top of cup rims of varying thicknesses. Above the two ramps 1B there are two grippers made of two opposite sections of serrated surfaces 1C which are shaped as matching zigzags with sharp protrusions. As shown in FIG. 2, these protrusions 1C are slightly bent inwards towards their midpoint and in opposite diagonal directions. The ramps 1B are diagonally bent outwards. As illustrated in FIG. 5, the inwards diagonal bending of the sharp protrusions 1C directs the protrusions toward the cup's wall surfaces, thus intensifying the friction force between the clasping device and the cup when the protrusions are pressed against the cup's walls. This in turn enhances the holding force of the clasping device 1A. The infusion bag 3A is attached to the string 2A using a staple 4. The other end 2C of the string 2A is tied to the side of the clasping device 1A by inserting the string 2A into two narrow slits 1D, which were cut at the side of the clasping device 1A and creating a wrapping 2B of the string around the side section 1G between the two slits 1D. An optional figurine 6 is attached to the top of the bridge 1E which connects the two arms 1F of the clasping device 1A. The figurine 6 could be hollow, made of flexible material and containing liquid additive which can be poured into the cup 5A by squeezing the figurine 6.

FIG. 2 describes a bottom view of the Clasping Device shown in FIG. 1. As can be observed, the two ramps 1B are slightly bent diagonally outwards and the pointed protrusions 1C of the serrated surfaces are bent diagonally inwards. This bending directs the sharp protrusions 1C towards the cup's wall surfaces and intensifies the holding force of the clasping device when it is installed on a cup.

Figure 3:
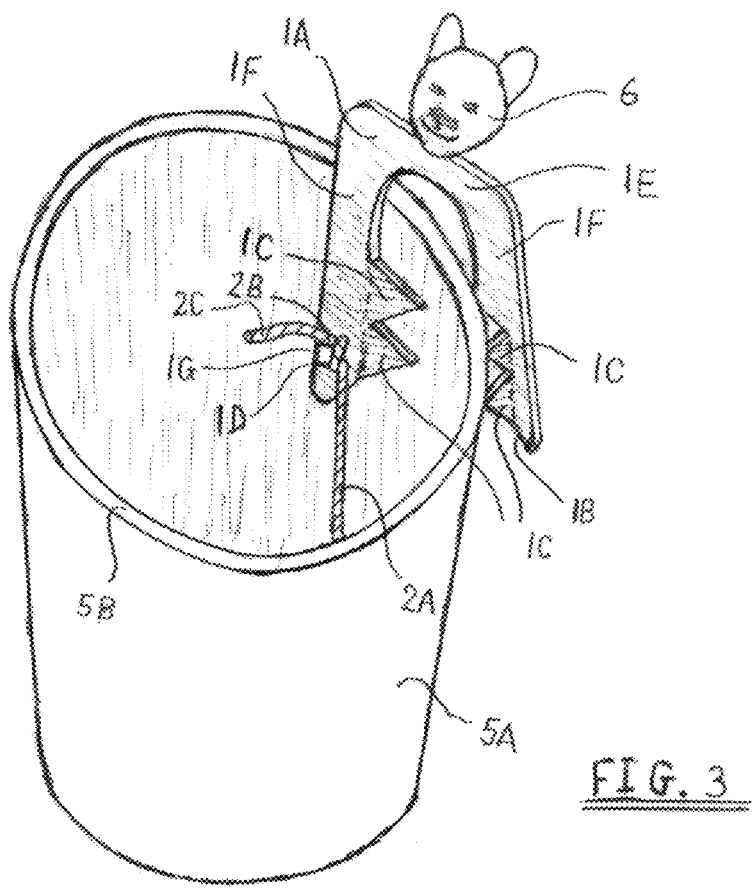
FIG. 3 shows a drawing of the 3D Clasping Device of FIG. 1, which is fully installed on a cup's rim.

FIG. 3 shows a drawing of the 3D Clasping Device 1A of FIG. 1, which is fully installed on a cup's rim 5B. The pointed protrusions 1C are shown to press their sharp tips on the inner and the outer surfaces of the cup's wall 5A in opposite locations. The protrusions 1C are slightly bent towards the wall of the cup 5A. The bending increases the protrusions 1C sharpness which concentrates the pressing force onto very small areas. Applying concentrated pressure on the surfaces intensifies the friction force between the sharp protrusions 1C and the cup's wall, which in turn increases the holding power of the clasping device 1A. The clasping device's bridge 1E and its arms 1F are made of resilient material and when they are in a twisted state as shown in FIG. 3, they exert an elastic power which causes the protrusions 1C to press onto the cup's wall 5A. FIG. 3 also shows the string 2A which is tied to the side of the clasping device 1A. The string's tie 2B is created by inserting the string 2A into the two narrow slits 1D and wrapping it around the side section 1G between the two slits 1D. The other end of the string 2A is tied to the infusion bag 3A which is hinged inside the cup 5A (not shown in FIG. 3). An optional figurine 6 is attached to the top of the bridge 1E. Such a figurine 6 can serve as an ornament or if it is made of hollow flexible material, it could contain a liquid additive, which could be poured into the cup 5A by squeezing.

Figure 4:
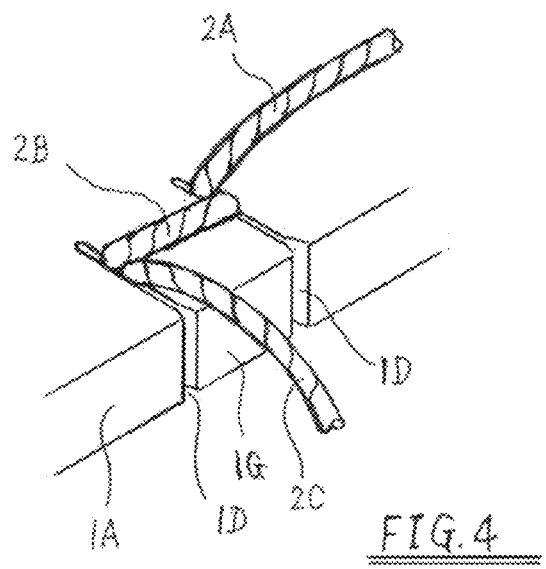
FIG. 4 shows an enlargement of a string tied and wrapped around the side section between two narrow slits, which were cut at the side of the clasping device.

FIG. 4 shows an enlargement of a string 2A tied and wrapped around the side section 1G between two narrow slits 1D, which were cut at the side of the clasping device 1A. The string's tie 2B is created by inserting the string 2A into the two slits 1D and wrapping it around the side section 1G between the two slits 1D. The string 2A is also tied to the infusion bag 3A (not shown in FIG. 4).

FIG. 5 shows a bottom view of the sharp protrusions 1C which serve as the grippers of the clasping device 1A. FIG. 5 shows the protrusions' 1C bottom view and describes their mutual position when they are mounted on the cup's rim. The bottom view in FIG. 5 was chosen since it shows the diagonal bending outwards of the ramps 1B and the diagonal bending inwards of the sharp protrusions 1C. FIG. 5 also shows the twisting of clasping device's arms 1F and bridge 1E caused by mounting the clasping device on top of the cup's rim 5B.

What is claimed is:

1. A clasping device for anchoring an infusion bag in a cup; wherein said clasping device has two connected arms; wherein each said arm has a gripper at its end; wherein said clasping device is made of resilient and flexible material; wherein said clasping device is tied with a string to said infusion bag, which hangs inside said cup; wherein said string has a first end and a second end; wherein said first end is connected to said infusion bag; wherein said second end is coiled around a section of said clasping device; wherein said section is situated between two slits in said clasping device; wherein upon installing said clasping device on top of a rim of a wall of said cup, each said gripper grasps firmly at said wall; thereby anchoring said clasping device in place on said rim and anchoring said infusion bag inside said cup.

2. A clasping device for anchoring an infusion bag in a cup; wherein said clasping device has two connected arms; wherein each said arm has a gripper at its end; wherein said clasping device is made of resilient and flexible material; wherein said clasping device is tied with a string to said infusion bag, which hangs inside said cup; wherein upon installing said clasping device on top of a rim of a wall of said cup, each said gripper grasps firmly at said wall; thereby, anchoring said clasping device in place on said rim and anchoring said infusion bag inside said cup; wherein said clasping device grips said wall by pressing said grippers at opposite sides of said wall; wherein pressing forces of said grippers on said wall are provided by elastic forces of said arms; wherein said elastic forces are created by widening the gap between said grippers; whereby bending and twisting said arms; wherein each said gripper has a shape of a serrated surface at said gripper's upper section and a shape of a ramp at said gripper's lower section; wherein the pair of said ramps are oriented diagonally with respect to one another such that they form a funnel's shape which widens towards the bottom; wherein widening of said gap between said grippers is done by mounting said clasping device on top of said rim such that said rim resides at midpoint between said ramps and pushing down said clasping device; whereby said rim moves upwards with respect to said ramps, pushes aside said ramps and widens said gap between said grippers.

3. A clasping device for anchoring an infusion bag in a cup; wherein said clasping device has two connected arms; wherein each said arm has a serrated gripper at its end; wherein said clasping device is made of elastic material; wherein said two connected arms are configured to clasp at a rim of a wall of said cup between two said serrated grippers employing an elastic twisting force; wherein said clasping device is tied with a string to said infusion bag, which hangs inside said cup; wherein upon installing said clasping device on top of a rim of a wall of said cup, each said gripper grasps firmly at said wall; thereby anchoring said clasping device in place on said rim and anchoring said infusion bag inside said cup; wherein a three dimensional figurine is attached to said clasping device.

4. The clasping device of claim number 3 wherein said three dimensional figurine is made of flexible material; wherein said three dimensional figurine is hollow and contains a liquid additive which can be poured into said cup by squeezing said three dimensional figurine.

* * * * *